(12) United States Patent
Zhuang

(10) Patent No.: US 12,510,772 B2
(45) Date of Patent: Dec. 30, 2025

(54) METHOD OF PRODUCING GRADIENT PHOTOCHROMIC LENS AND PRODUCT THEREOF

(71) Applicant: Sunever Eyewear Co., Ltd., Tainan (TW)

(72) Inventor: Yi Zhuang, Tainan (TW)

(73) Assignee: Sunever Eyewear Co., Ltd., Tainan (TW)

( * ) Notice: Subject to any disclaimer, the term of this patent is extended or adjusted under 35 U.S.C. 154(b) by 422 days.

(21) Appl. No.: 18/299,136

(22) Filed: Apr. 12, 2023

(65) Prior Publication Data

US 2024/0345421 A1    Oct. 17, 2024

(51) Int. Cl.
*G02C 7/10* (2006.01)
*B29D 11/00* (2006.01)
*D06P 5/02* (2006.01)

(52) U.S. Cl.
CPC ........ *G02C 7/102* (2013.01); *B29D 11/00653* (2013.01); *D06P 5/02* (2013.01); *G02C 2202/16* (2013.01)

(58) Field of Classification Search
CPC ............... G02C 7/102; G02C 2202/16; B29D 11/00653; B29D 11/0073; B29D 11/00903; D06P 5/02; G02B 5/23; G02B 1/041; G02B 1/14
See application file for complete search history.

(56) References Cited

U.S. PATENT DOCUMENTS

| | | | |
|---|---|---|---|
| 2004/0109133 A1* | 6/2004 | Kadowaki | G02B 5/23 351/159.61 |
| 2005/0116381 A1* | 6/2005 | Wong | B29D 11/0073 264/236 |
| 2008/0187760 A1* | 8/2008 | Wiand | B29D 11/00653 428/411.1 |
| 2020/0201079 A1* | 6/2020 | Liang | B29D 11/00009 |
| 2020/0363659 A1* | 11/2020 | Ambler | G02C 7/102 |

FOREIGN PATENT DOCUMENTS

TW       200918982 A    *    5/2009

* cited by examiner

*Primary Examiner* — William R Alexander
*Assistant Examiner* — Mackenzi Waddell
(74) *Attorney, Agent, or Firm* — Best & Flanagan LLP

(57) ABSTRACT

A method of producing a gradient photochromic lens comprises providing a lens and a dyeing trough, with the lens including a front surface and a rear surface; immersing the lens in the dyeing trough to proceed with dyeing, and moving the lens out of the dyeing trough, forming a gradient dyed layer on each of the front surface and the rear surface of the lens after drying and hardening; providing a photochromic optical adhesive including a color changing agent combined with an optical adhesive; providing a film having a bonding face, and disposing the photochromic optical adhesive on the bonding face; and bonding the film to the front surface of the lens via the bonding face. The lens produced from the method provides a gradient photochromic effect while increasing the absorption effect of ultraviolet rays and prolonging the service life.

9 Claims, 3 Drawing Sheets

METHOD OF PRODUCING GRADIENT PHOTOCHROMIC LENS AND PRODUCT THEREOF

BACKGROUND OF THE INVENTION

The present invention relates to a method of producing a gradient photochromic lens and a product thereof and, more particularly, to a method of producing a lens providing a gradient, stable photochromic function and the product thereof.

A surface of a lens can be dyed to absorb ultraviolet (UV) rays for preventing eyes from being injured by UV radiation. In production, different portions of the lens are immersed for different periods of time, and different portions on the surface of the lens have different coating thicknesses and different colors. Thus, the lens has an upper portion with a darker intensity and a lower portion with a lighter intensity, providing a gradient effect while being in line with people's preference in the stylish outline. When used in outdoor sports, the upper portion of the lens can block strong light, and the lower portion of the lens can provide a clear vision. However, the light transmission rate of a lens having a darker intensity is not good and, thus, not suitable for indoor use. Therefore, a user must prepare two lenses having a darker intensity and a lighter intensity for outdoor and indoor use respectively, which is inconvenient to use.

To increase the user's convenience, a layer of color changing agent is disposed on a surface of a current lens by immersion. The color changing agent becomes dark when irradiated by light and can absorb strong light and UV rays. When in a dim environment, the color changing agent restores its original color.

However, to increase the photochromic effect, the lens after immersion with the color changing agent must be moved out and dried and then immersed again. This procedure repeats a plurality of times to increase the thickness of the color changing agent layer on the lens, which is time-consuming and ineffective. Furthermore, a thicker color changing agent layer adversely affects the optical effect of the lens. Furthermore, the color changing agent on the surface of lens in direct contact with the outside will deteriorate due to oxidation, resulting in reduction or loss of the photochromic function.

Furthermore, when it is desired to provide the color changing agent on the surface of the lens with a gradient effect, repeated immersion is required, which is difficult to control, whereas the uniformity is not good, as the immersion portions and immersion times are not consistent throughout the repeated immersion treatment. In a case that the lens is firstly dyed to form a gradient layer and then immersed in a color changing agent, the dye immersed in a trough receiving the color changing agent will peel and mix with the color changing agent. As a result, the expensive color changing agent in the trough is polluted.

BRIEF SUMMARY OF THE INVENTION

An objective of the present invention is to provide a method of producing a lens providing a gradient, stable photochromic function and a product thereof.

A method of producing a gradient photochromic lens according to the present invention comprises providing a lens and a dyeing trough, with the lens including a front surface and a rear surface; immersing the lens in the dyeing trough to proceed with dyeing, and moving the lens out of the dyeing trough, forming a gradient dyed layer on each of the front surface and the rear surface of the lens after drying and hardening; providing a photochromic optical adhesive including a color changing agent combined with an optical adhesive; providing a film having a bonding face, and disposing the photochromic optical adhesive on the bonding face; and bonding the film to the front surface of the lens via the bonding face.

The method of producing gradient photochromic lens according to the present invention is easy while avoiding improper mixing of the dye and the color changing agent. Since the method according to the present invention uses the photochromic optical adhesive, the color of the deep color area does not have to be too dark. The deep color area of the lens can absorb ultraviolet rays projected downwards and can block strong light. The light color area can provide a clear vision. Furthermore, when the external sunlight is incident on the film, the photochromic optical adhesive receiving the light becomes dark while absorbing the ultraviolet rays, providing a double absorption effect of the ultraviolet rays. On the other hand, when the lens is in a dim environment, the photochromic optical adhesive restores the clear condition to provide a clear vision in the weak-light environment.

The film on the outermost side of the lens can shield the photochromic optical adhesive and the dyed layers. This avoids the photochromic optical adhesive and the dyed layers from direct contact with the ambient air, thereby avoiding deterioration. Furthermore, the photochromic optical adhesive and the dyed layers are avoided from being scratched, thereby prolonging the service life of the lens.

The present invention will become clearer in light of the following detailed description of illustrative embodiments of this invention described in connection with the drawings.

DETAILED DESCRIPTION OF THE INVENTION

Figure 1:
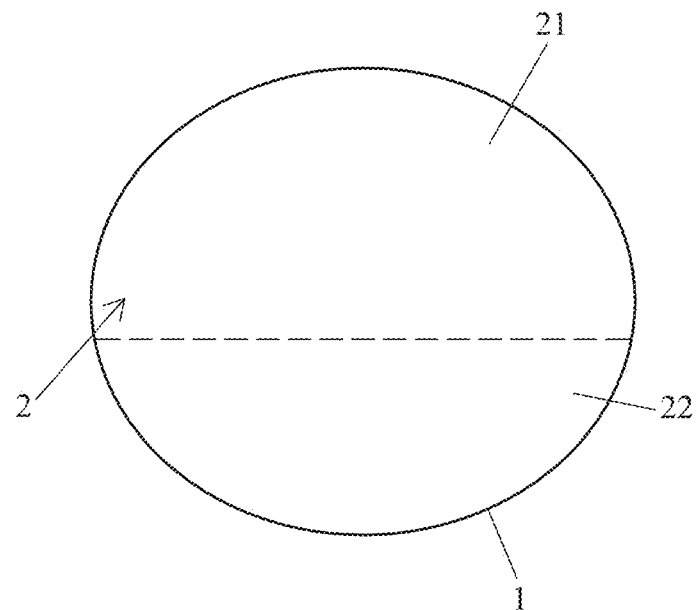
FIG. 1 is a diagrammatic perspective view illustrating a lens of an embodiment according to the present invention after dyeing.
Figure 2:
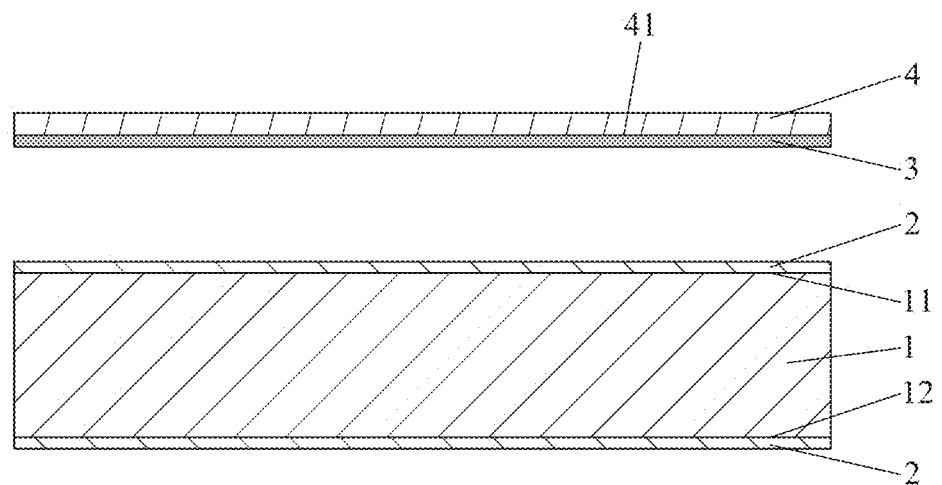
FIG. 2 is an exploded, cross-sectional view of the dyed lens and a film of an embodiment according to the present invention.
Figure 3:
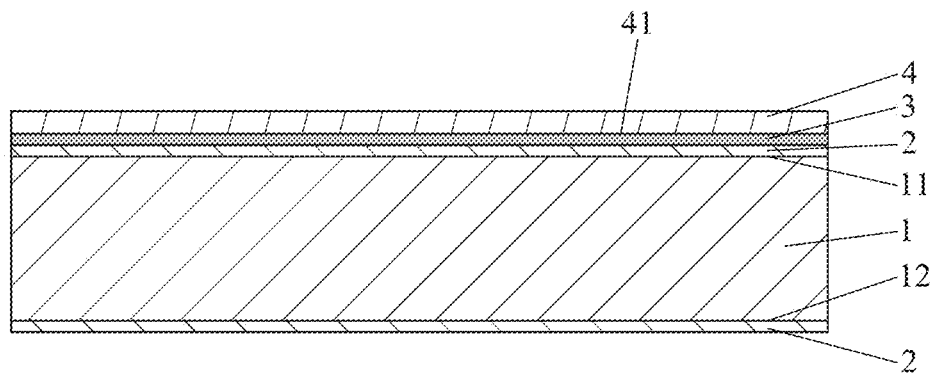
FIG. 3 is a cross sectional view of a gradient photochromic lens of an embodiment according to the present invention.

With reference to FIGS. 1-3, a method of producing a gradient photochromic lens of an embodiment according to the present invention comprises the following steps. At step S1, a lens 1 and a dyeing trough (not shown) are provided. The lens 1 includes a front surface 11 and a rear surface 12.

As shown in FIG. 2, at step S2, the lens is immersed in the dyeing trough to proceed with dyeing. Then, the lens 1 is moved out. After drying and hardening, a gradient dyed layer 2 is formed on each of the front surface 11 and the rear surface 12 of the lens 1.

At step S3, a photochromic optical adhesive 3 including a color changing agent combined with an optical adhesive is provided.

At step S4, a film 4 having a bonding face 41 is provided. The photochromic optical adhesive 3 is disposed on the bonding face 41.

At step S5, as shown in FIG. 3, the film 4 is bonded to the front surface 11 of the lens 1 via the bonding face 41.

The lens 1 at step S1 is a plastic lens and may be made of polycarbonate, nylon, or urethane. The lens 1 may have or may not have prescription. Furthermore, the front surface 11 and the rear surface 12 of the lens 1 after formation are subjected to coating and hardening treatment (not shown). A dye with a predetermined color is received in the dyeing trough.

At step S2, different portions of the lens 1 are immersed in the dyeing trough for different periods of time, and the lens 1 is moved out and dried to form two dyed layers 2 having different colors at different portions of the lens. As shown in FIGS. 1 and 2, the immersing time of the upper portion of the lens 1 is longer than the immersing time of the lower portion of the lens 1. Furthermore, the color intensity level at the upper portion of each of the front surface 11 and the rear surface 12 of the lens 1 is darker than the color intensity level of the lower portion of each of the front surface 11 and the rear surface 12 of the lens 1, with the upper portion and the lower portion respectively having a deep color area 21 and a light color area 22. Furthermore, a gradient dyed layer 2 presenting an effect with different thicknesses can be provided.

At step S3, the color changing agent is mixed with the optical adhesive with stickiness. Thus, the photochromic optical adhesive 3 including the color changing agent is sticky.

The film 4 at step S4 may be made of cellulose acetate (CA), cellulose triacetate (TAC), or polyethylene terephthalate (PET). Furthermore, the photochromic optical adhesive 3 prepared in step S3 is applied to the bonding face 41 of the film 4 to thereby bond with the film 4.

The method of producing gradient photochromic lens 1 according to the present invention is easy while avoiding improper mixing of the dye and the color changing agent. Since the method according to the present invention uses the photochromic optical adhesive 3, the color of the deep color area 21 does not have to be too dark. The deep color area 21 of the lens 1 can absorb ultraviolet rays projected downwards and can block strong light. The light color area 22 can provide a clear vision. Furthermore, when the external sunlight is incident on the film 4, the photochromic optical adhesive 3 receiving the light becomes dark while absorbing the ultraviolet rays, providing a double absorption effect of the ultraviolet rays. On the other hand, when the lens 1 is in a dim environment, the photochromic optical adhesive 3 restores the clear condition to provide a clear vision in the weak-light environment.

When a wearer of a pair of glasses including the lenses 1 according to the present invention is in a car or the like, the thermal insulating film on the windshield of the car absorbs the sunlight, such that the photochromic optical adhesive 3 is not apt to change its color. In this case, the dyed layers 2 of each lens 1 can still maintain its color and absorb the ultraviolet rays to avoid the eyes of the wearer from direct sunlight, providing more comfortable and safer driving.

The film 4 on the outermost side of the lens 1 can shield the photochromic optical adhesive 3 and the dyed layers 2. This avoids the photochromic optical adhesive 3 and the dyed layers 2 from direct contact with the ambient air, thereby avoiding deterioration. Furthermore, the photochromic optical adhesive 3 and the dyed layers 2 are avoided from being scratched, thereby prolonging the service life of the lens 1.

The gradient photochromic lens 1 produced from the method according to the present invention comprises a lens 1, two dyed layers 2, a photochromic optical adhesive 3, and a film 4. The lens 1 includes a front surface 11 and a rear surface 12. The two dyed layers 2 are respectively and gradiently disposed on the front surface 11 and the rear surface 12 of the lens 1. The photochromic optical adhesive 3 includes a color changing agent combined with an optical adhesive. The film 4 includes a bonding face 41 at a side thereof. The photochromic optical adhesive 3 is bonded to the bonding face 41. The film 4 is disposed on the front surface 11 of the lens 1 by the bonding face 41.

In view of the foregoing, the lens 1 produced from the method according to the present invention provides a gradient photochromic effect while increasing the absorption effect of ultraviolet rays and prolonging the service life.

Although specific embodiments have been illustrated and described, numerous modifications and variations are still possible without departing from the scope of the invention. The scope of the invention is limited by the accompanying claims.

The invention claimed is:

1. A method of producing a gradient photochromic lens, with the method comprising:
   providing a lens and a dyeing trough, with the lens including a front surface and a rear surface;
   immersing the lens in the dyeing trough to proceed with dyeing, and moving the lens out of the dyeing trough, forming a gradient dyed layer on each of the front surface and the rear surface of the lens after drying and hardening;
   providing a photochromic optical adhesive including a color changing agent combined with an optical adhesive;
   providing a film having a bonding face, and disposing the photochromic optical adhesive on the bonding face; and
   bonding the film to the front surface of the lens via the bonding face.

2. The method of producing the gradient photochromic lens as claimed in claim 1, wherein the lens is a plastic lens, and wherein the front surface and the rear surface of the lens after formation are subjected to coating and hardening treatment.

3. The method of producing the gradient photochromic lens as claimed in claim 1, wherein different portions of the lens are immersed in the dyeing trough for different periods of time, and the lens is moved out and dried to form different colors at different portions of the lens.

4. The method of producing the gradient photochromic lens as claimed in claim 3, wherein an immersing time of an upper portion of the lens is longer than an immersing time of a lower portion of the lens, wherein a color intensity level at the upper portion of each of the front surface and the rear surface of the lens is darker than a color intensity level of each of the lower portion of the front surface and the rear surface of the lens.

5. The method of producing the gradient photochromic lens as claimed in claim 1, wherein the film is made of cellulose acetate (CA), cellulose triacetate (TAC), or polyethylene terephthalate (PET).

6. A gradient photochromic lens comprising:
   a lens including a front surface and a rear surface; two dyed layers respectively disposed on the front surface and the rear surface of the lens in a gradient pattern;
   a photochromic optical adhesive including a color changing agent combined with an optical adhesive; and
   a film including a bonding face at a side thereof, wherein the photochromic optical adhesive is bonded to the bonding face, and wherein the film is disposed on the front surface of the lens by the bonding face.

7. The gradient photochromic lens as claimed in claim 6, wherein the lens is a plastic lens, and wherein the front surface and the rear surface of the lens after formation are subjected to coating and hardening treatment.

8. The gradient photochromic lens as claimed in claim 6, wherein the lens have different colors at different portions and includes a deep color area and a light color area.

9. The gradient photochromic lens as claimed in claim 8, wherein the film is made of cellulose acetate (CA), cellulose triacetate (TAC), or polyethylene terephthalate (PET).

* * * * *